US006215416B1

(12) United States Patent
Henderson

(10) Patent No.: US 6,215,416 B1
(45) Date of Patent: Apr. 10, 2001

(54) AIRCRAFT THERMAL LANDING SIGNALING SYSTEM

(76) Inventor: Jeffrey B. Henderson, R.R. 1 Box 1510 Eatonton Rd., Jones County, GA (US) 31032

( * ) Notice: Subject to any disclaimer, the term of this patent is extended or adjusted under 35 U.S.C. 154(b) by 0 days.

(21) Appl. No.: 09/404,748

(22) Filed: Sep. 24, 1999

Related U.S. Application Data

(63) Continuation-in-part of application No. 09/080,098, filed on May 18, 1998, now Pat. No. 6,051,840.
(51) Int. Cl.[7] .................................................. G01S 1/00
(52) U.S. Cl. .................... 340/945; 340/947; 250/504 R; 250/494.1; 250/495.1; 250/493.1
(58) Field of Search ............................ 250/504 R, 494.1, 250/495.1, 493.1; 340/947, 945

(56) References Cited

U.S. PATENT DOCUMENTS

| 4,945,248 | * | 7/1990 | Farr .................................. 250/493.1 |
| 5,567,950 | * | 10/1996 | Meeker et al. .................. 250/504 R |
| 5,736,744 | * | 4/1998 | Johannsen et al. ............... 250/505.1 |

* cited by examiner

Primary Examiner—Bruce C. Anderson
Assistant Examiner—Nikita Wells
(74) Attorney, Agent, or Firm—Thomas, Kayden, Horstemeyer & Risley

(57) ABSTRACT

The present invention relates to a thermal signaling device. The signaling device generally comprises a container including a thermal emitting surface and an interior space, and at least one heat source disposed within the interior space of the container. In operation, the heat source is activatable to heat the thermal emitting surface such that the thermal emitting surface can be detected by a thermal sensing system.

34 Claims, 5 Drawing Sheets

AIRCRAFT THERMAL LANDING SIGNALING SYSTEM

CROSS REFERENCE

This application is a continuation-in-part of U.S. Application Ser. No. 09/080,098, filed May 18, 1998, now U.S. Pat. No. 6,051,840.

FIELD OF THE INVENTION

The present invention relates generally to a thermal signaling system. More particularly, the present invention relates to method and apparatus well-suited for signaling to aircraft from the ground.

BACKGROUND OF THE INVENTION

Often times it is necessary to signal to an aircraft from the ground. For example, in military tactical operations, ground troops signal aircraft such as helicopters to identify landing sites, targets, and the like. In that such aircraft often fly night missions, they normally are equipped with heat sensors, such as infrared sensors, by which the aircraft can be flown. For instance, the AH-64 (Apache) helicopter is equipped with forward looking infrared (FLIR) that senses light in the 6–12 micron range.

Despite being so equipped, helicopters normally are landed in night tactical environments without the use of heat sensing systems such as FLIR. In the case of the AH-64 helicopter, a copilot gunner positioned in the front seat of the helicopter images light signals sent from personnel on the ground and, from these light signals, provides verbal instructions to the pilot-in-command seated in the back seat to aide him in landing the aircraft. Such verbal instructions from the copilot gunner generally are necessary in such situations because the pilot-in-command cannot see the immediate foreground of the helicopter. The light signals sent to the helicopter occupants normally are made with a plurality of individual light sources such as light sticks. To aid the copilot gunner in viewing the light signal, the copilot normally uses night vision goggles which amplify the light signals emitted by the light sources.

The signaling procedure described above is lacking for several reasons. First, the pilot-in-command must land the helicopter "blind" in that the light sources used to form the light signal do not emit enough heat so as to be detectable with heat sensing systems such as FLIR. Therefore, the pilot-in-command must rely solely on the verbal instructions given by the copilot gunner seated in the front seat in landing the aircraft. Although the verbal instructions provided by the copilot gunner normally are adequate so as to facilitate proper landing of the helicopter, such a procedure is inferior to a procedure in which the pilot-in-command can also see the signals provided by the ground personnel. Moreover, since the copilot gunner must concentrate on the light signals and on providing precise verbal instructions to the pilot-in-command, the copilot cannot focus on ensuring that the aircraft is clear of all obstructions that could interfere with the aircraft during landing. Therefore, the landing procedure described above provides a substantial risk of crash landings and personnel injuries. In addition to the craft landing disadvantages of conventional signaling systems, use of such systems further invites enemy attack, in that conventional light sources emit light in the visible spectrum. These light signals directed toward friendly aircraft can similarly be seen by enemy troops. Therefore, when such signaling systems are used, the aircraft occupants, as well as ground personnel, are vulnerable to enemy attack.

In an attempt to overcome some of the drawbacks of the aforementioned signaling systems, alternative field solutions have been tried. In one such solution, metal cans, such as coffee cans, have been filled with sand soaked in jet fuel and then ignited so as to burn the jet fuel. Once the fuel had burned for a period of time adequate to heat the metal cans and sand, the flames were extinguished and the cans arranged in an inverted "Y" configuration such that the heat signature of the cans would create a thermal "Y" signal that could be detected by the helicopter heat sensing system. Although providing enough heat so that the heat sensing system could be utilized, this signaling system also is disadvantageous for several reasons. First, jet fuel is highly flammable. For this reason, its use creates unacceptable safety risks to ground personnel and aircraft occupants alike. Secondly, the heated cans provide non-directional heat signals that can be detected by enemy forces as well as the aircraft pilots. Therefore, the use of such heat signaling devices again risks enemy attacks.

From the above, it can be appreciated that it would be advantageous to have a thermal signaling system that is detectable by a heat sensing systems such as FLIR which further is generally safe to use and which is not easily detectable to enemy troops.

SUMMARY OF THE INVENTION

The present invention relates to a thermal signaling device, comprising a container including a thermal emitting surface and an interior space, and at least one heat source disposed within the interior space of the container. In operation, the heat source is activatable to heat the thermal emitting surface such that the thermal emitting surface can be detected by a thermal sensing system.

In a preferred embodiment, the container includes a container body which forms the interior space, and a container lid that forms the thermal emitting surface. Furthermore, the device preferably comprises a retractable support mechanism with which the container can be supported in a reclined orientation.

In addition, the present invention relates to a method for signaling to an aircraft, comprising activating at least one non-electrical, non-volatile heat source, positioning at least one signaling container on the ground in a desired pattern, each signaling container including a thermal emitting surface, and placing at least one heat source in each of the containers such that the heat source will heat the thermal emitting surface so that aircraft can detect the thermal emitting surface with a heat sensing system.

The features and advantages of this invention will become apparent upon reading the following specification, when taken in conjunction with the accompanying drawings. It is intended that all such additional features and advantages be included therein with the scope of the present invention, as defined by the claims.

BRIEF DESCRIPTION OF THE DRAWINGS

The invention can better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
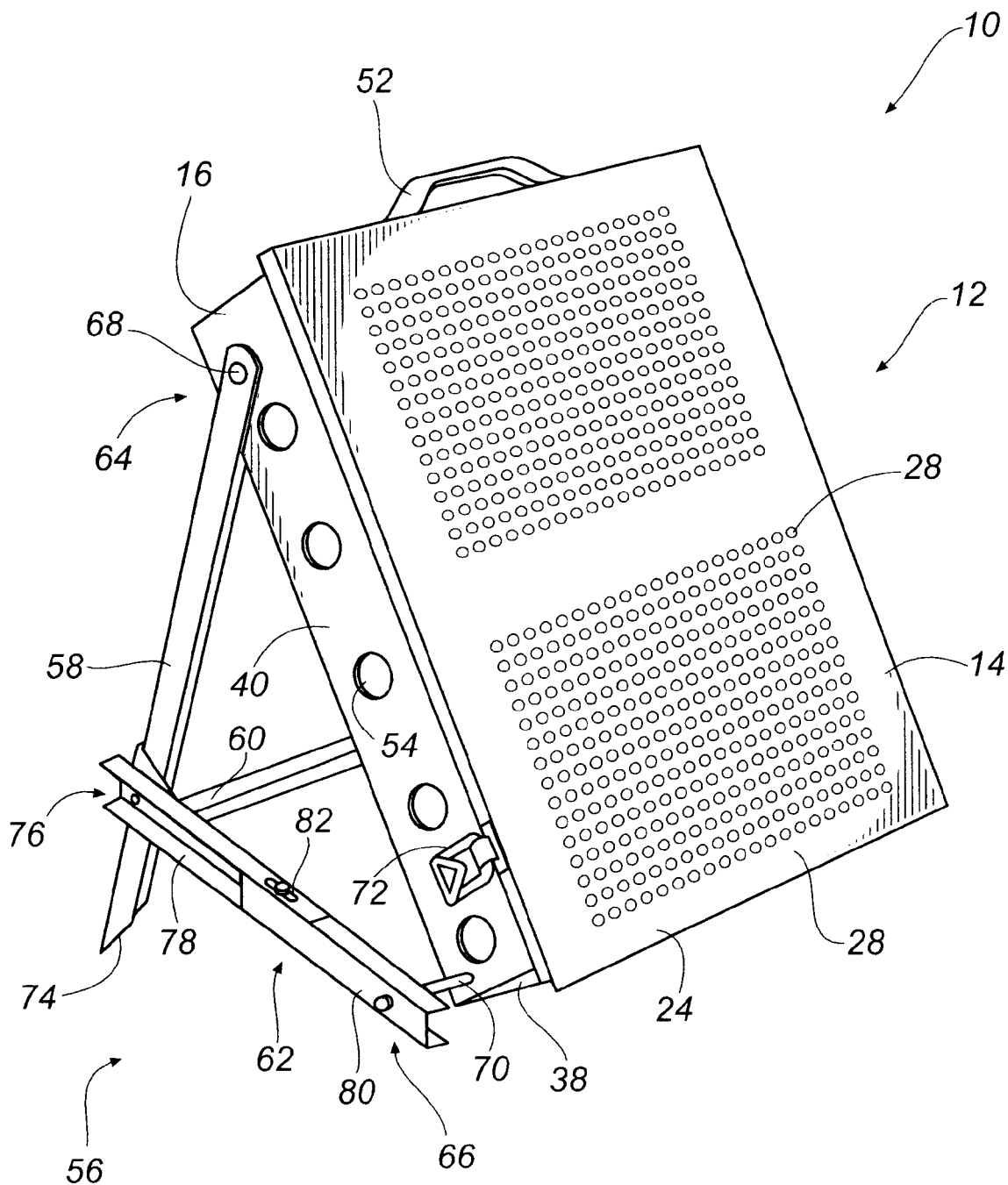
FIG. 1 is a perspective view of a signaling device of the thermal signaling system.

Referring now in more detail to the drawings, in which like numerals indicate corresponding parts throughout the several views, FIGS. 1–5 illustrate an embodiment of a signaling device 10 of the present thermal signaling system. The signaling device 10 comprises a container 12 which holds a heat source which is described below. As indicated in the figures, the container 12 is substantially rectilinear in shape and generally comprises a cover or lid 14 and a container body 16, both of which normally are constructed from a heavy gauge sheet metal material. The lid 14 is pivotally connected to the container body 16 with a hinge 18 (FIG. 2) such that the lid can be pivoted about the hinge to open the container 12 and provide access to an interior space 20 of the container. The lid comprises a body portion 22 which forms an exterior surface 24 and an interior surface 26. Formed in the body portion 22 is a plurality of perforations 28 that extend from the exterior surface 24 to the interior surface 26 of the lid 14. In addition, the lid 14 comprises a plurality of edge flanges 30 that typically extend from the edges of the exterior surface 24 of the lid 14 downwardly therefrom such that the lid partially encapsulates the container body 16 when in the closed position shown in FIG. 1. One more gaskets 31 are secured to the interior surface 26 of the lid 14 along the edged flanges 30 such that the lid is thermally insulated from the container body 16 when in the closed position. Further provided on the lid 14 are clasp members 32 that are positioned on the edge flanges 30 of the lid adjacent a distal end of the lid. As is described below, the clasp members 32 form part of a lid fastening mechanism that is used to secure the container 12 in the closed position.

Figure 2:
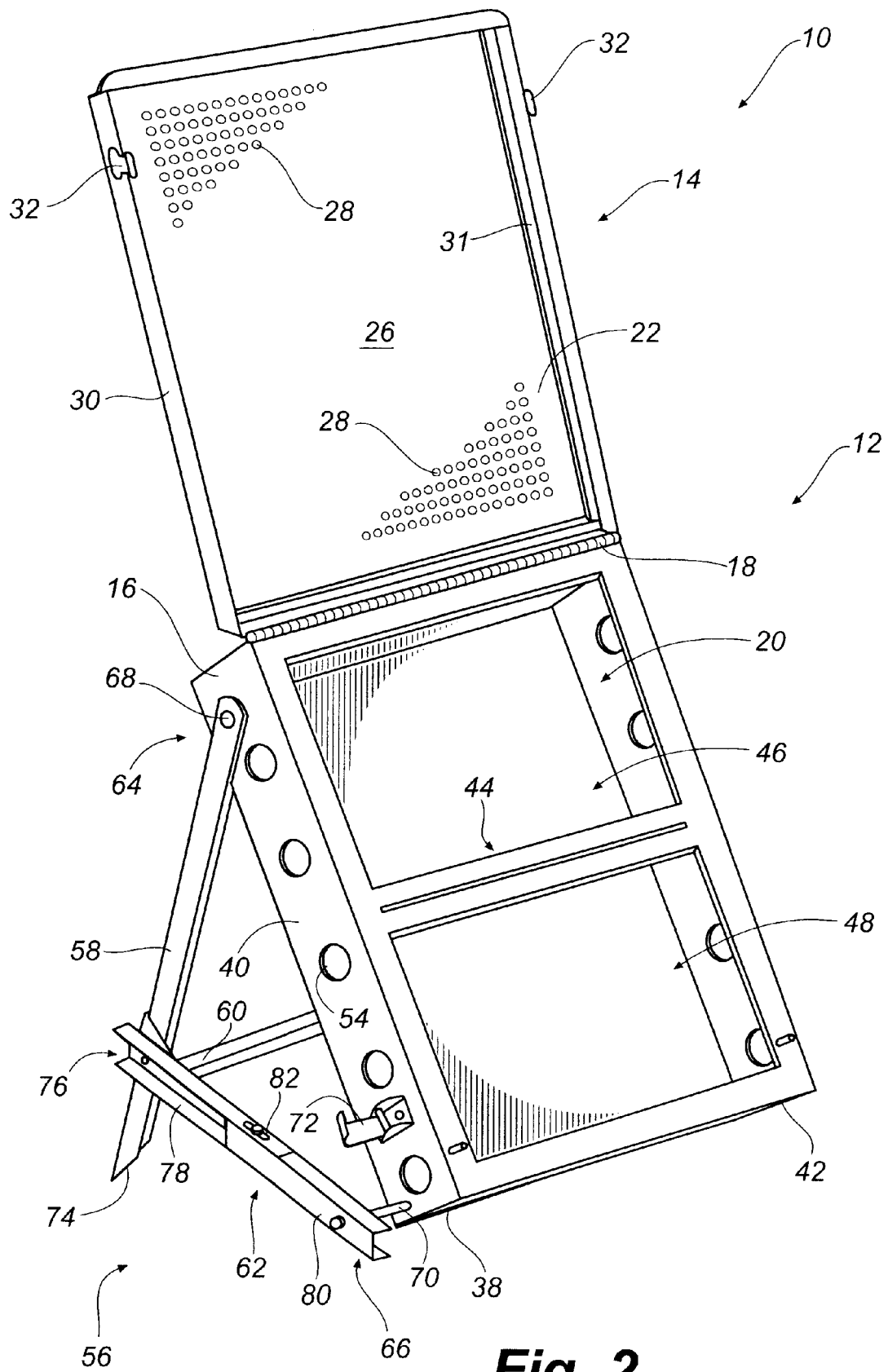
FIG. 2 is a perspective view of the signaling device shown in FIG. 1, depicted with its lid in an open position and the container body empty.
Figure 3:
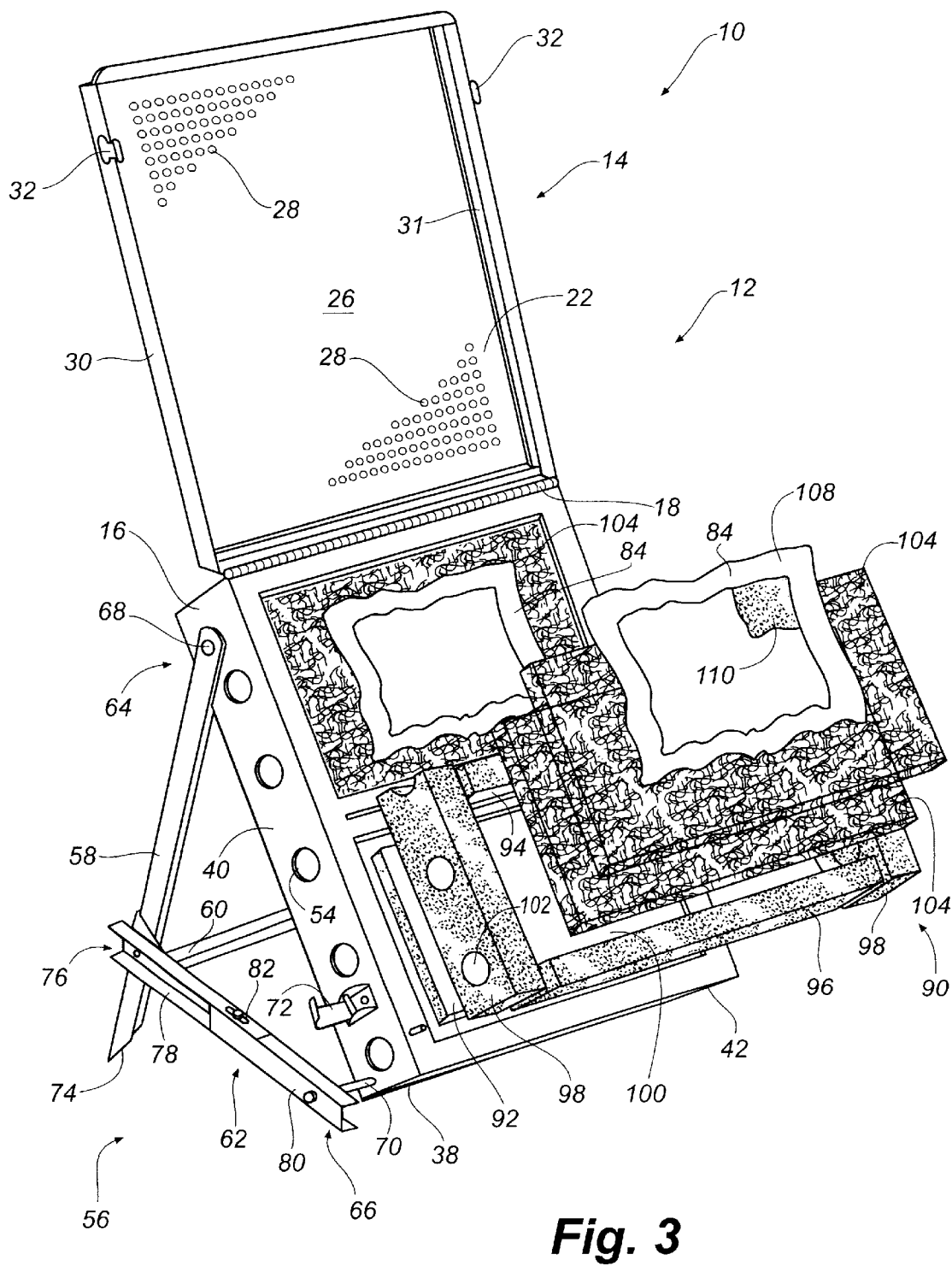
FIG. 3 is a perspective view of the signaling device shown in FIGS. 1 and 2 with the container body filled.
Figure 4:
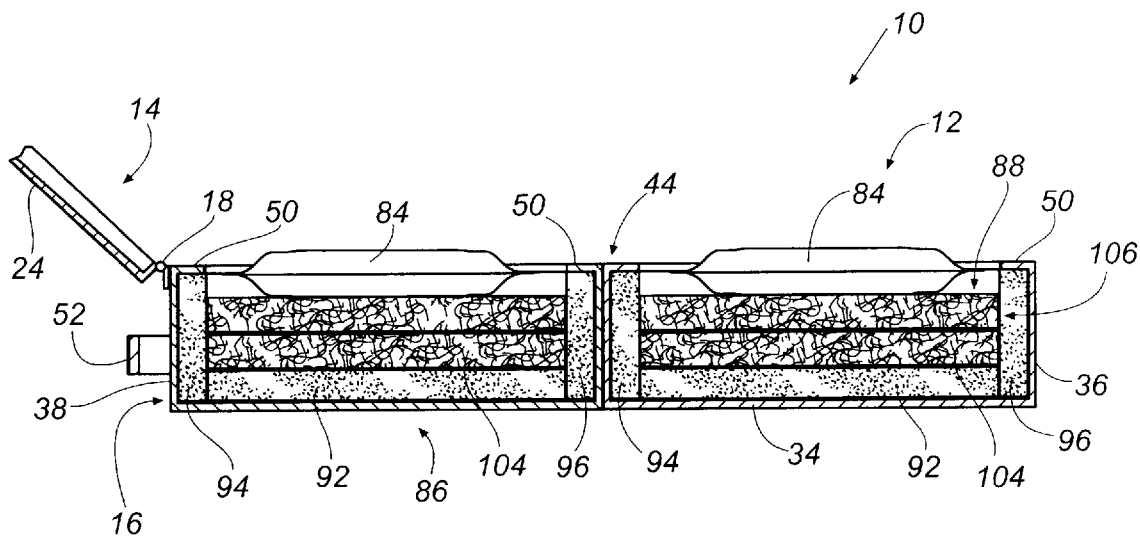
FIG. 4 is a cross-sectional view of the container body of the signaling device shown in FIGS. 1–3.

The container body 16 normally includes a rear side 34, a top end 36, a bottom end 38, and first and second lateral sides 40 and 42. As indicated most clearly in FIGS. 2 and 4, the container 12 further typically comprises a divider 44 that separates the interior space 20 of the container body into first and second compartments 46 and 48. As shown most clearly in FIG. 4, each of the top end 36, bottom end 38, first and second lateral sides 40 and 42, and the divider 44, typically are provided with inner flanges 50 that, as described below, are used to retain insulation which normally is used with the device 10. As indicated in FIGS. 1 and 4, the top end 36 typically is provided with a carrying handle 52. Finally, as indicated in FIGS. 1–3, the first and lateral sides 40 and 42 are provided with a plurality of openings 54 that provide for the ingress of air from the environment when the container 12 is closed.

Connected to the outside of the container body 16 is a retractable support mechanism 56. Although capable of myriad different forms, the retractable support mechanism of the disclosed embodiment typically comprises two support legs 58 that are connected with a cross-member 60. The support legs 58 are pivotally attached to the container body 16 at a first pivot point 64 located adjacent a top portion of the container body. In addition to the support legs, the device 10 normally includes support arms 62 that each is pivotally attached to the container body 16 at a second pivot point 66 located adjacent a bottom portion of the container body. The support legs 58 normally are pivotally mounted to the container body with conventional fasteners such as rivets 68, while the support arms 62 normally are connected to the container body 16 with axle members 70 to provide space for manipulation of a fastener member 72 that is mounted to the container body adjacent to pivot point 66. Like the clasp members 32 mounted on the container lid 14, these fastener members 72 form part of the fastening mechanism, and are adapted to mate with the clasp members to secure the lid in the closed position. Each support leg 58 typically is arranged as an angle member constructed out of a strong material such as steel and normally includes a pointed tip 74. This configuration facilitates the driving of the legs 58 into the ground to fix the position of the signaling device 10 when used in a field environment. As indicated in FIGS. 1–3, the support arms 62 are pivotally attached to each support leg 58 at a third pivot point 76 located adjacent a distal portion of the support leg. In a preferred arrangement, each support arm 62 is telescopic in nature and comprises first and second sliding members 78 and 80 that are longitudinally extensible with respect to each other such that each arm can be positioned in an extended position when the device is used for signaling aircraft, and a retracted position when the device is to be stored. One or more of the support arms 62 is provided with a locking mechanism 82 such that the support arm provided with the locking mechanism locks when fully extended a first time, but releases when the support arm is moved towards the retraction direction and again fully extended. With particular reference to FIGS. 3 and 4, the signaling device 10 further comprises one or more heat sources 84 that can be disposed within the interior space 20 of the container body 16. In addition to the heat sources 84, the container body 16 further houses insulation 86 and permeable separation material 88. The insulation 86 ensures that the radiant heat emitted by the heat sources 84 only escapes the container 12 through the lid 14, and the separation material ensures that oxygen can reach each side of the heat sources. In a preferred arrangement, the insulation 86 takes the form of a plurality of insulation panels 90 that are disposed in the first and second compartments 46 and 48 of the container body 16. By way of example, the insulation panels can be arranged as a base panel 92, an upper panel 94, a lower panel 96, and side panels 98, which are provided in both the first and second compartments 46 and 48, respectively. Although capable of alternative construction, the insulation panels 90 typically are composed of a polymeric foam that is highly thermally insulative. In addition, each of the insulation panels 90 can be provided with an outer reflective surface 100 that is thermally reflective. By way of example, this outer reflective surface 100 can comprise a metallic film. As indicated in FIG. 3, each side panel 98 is provided with a plurality of openings 102 which are arranged so as to align with openings 54 provided in the lateral sides 40, 42 of the container body 16.

Each of the insulation panels 90 normally is adapted to fit behind the inner flanges 50 formed along the container body 16, as depicted in FIG. 4. Preferably, each insulation panel 90 is sized and configured so as to frictionally fit between the inner flanges and the rear side 34 of the container body 16 so as to be held in place against shifting. Typically, the inner permeable separation material 88 comprises one or more separator panels 104 that are sized and configured to fit in each compartment 46, 48 of the container body 16 between the insulation panels 90, as shown in FIG. 4. These separator panels 104 support the heat sources 84 such that an air gap 106 is provided between the insulation 86 and the heat source to ensure that air entering the container body 16 through the openings 54 can reach the inner side of the heat source. Although the separator panels 104 can be constructed of any material which is highly permeable and the separator panels preferably are formed of a polymeric non-woven material.

The heat sources 84 must be capable of generating a relatively large amount of heat to provide a large thermal signature that can be readily detected by an aircraft heat sensing system such as FLIR. In a preferred arrangement, each heat source 84 comprises an air activated heat source such as a heat bag having an air permeable outer skin 108 that encapsulates a mixture of fuel 110. The outer skin 108 typically is a non-woven nylon fabric while the fuel 110 typically is a powdered mixture of reactants that generate heat when exposed to oxygen. By way of example, this powdered mixture can comprise iron fillings. When this mixture of ingredients is exposed to oxygen, the moisture released by the mixture quickly oxidizes the iron fillings. The oxidization of the iron filings occurs at such an increased rate that a substantial amount of heat is generated through an exothermic reaction. In a preferred arrangement, each air activated heat bag holds approximately 2.5 lbs. of fuel, and when used in combination with the container 12 disclosed herein, heats to a temperature of approximately 190° F. for a period of approximately 6 to 12 hours. This temperature is sufficient to ensure heating of the lid 14 of the container 12 to a temperature at least 40° F. above the ambient temperature. This temperature differential is enough to permit sighting of the device 10 up to distances in excess of 3,000 meters away. To ensure that the lid 14 is adequately heated, the insulation 86 and separation material 88 is sized such that each heat bag 84 is pressed firmly against the lid when the lid is closed as indicated by the raised position of the heat bags shown in FIG. 4.

Figure 6:
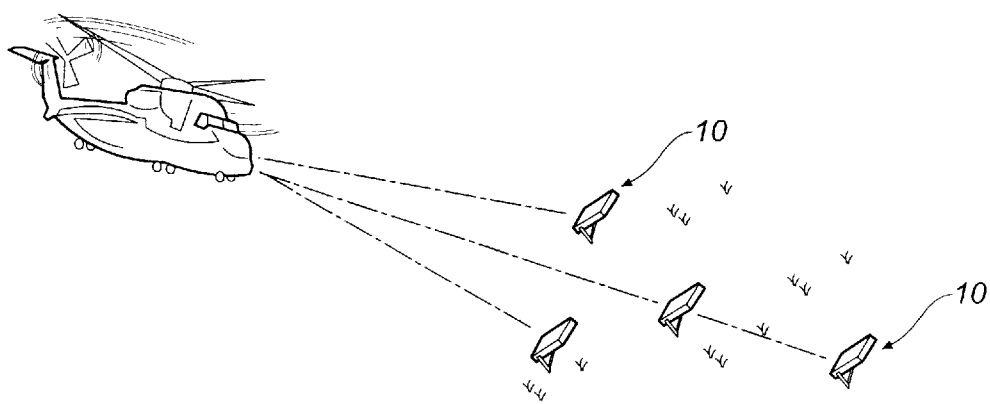
FIG. 6 illustrates use of the signaling device shown in FIGS. 1–5 in a night tactical environment.
Figure 5:
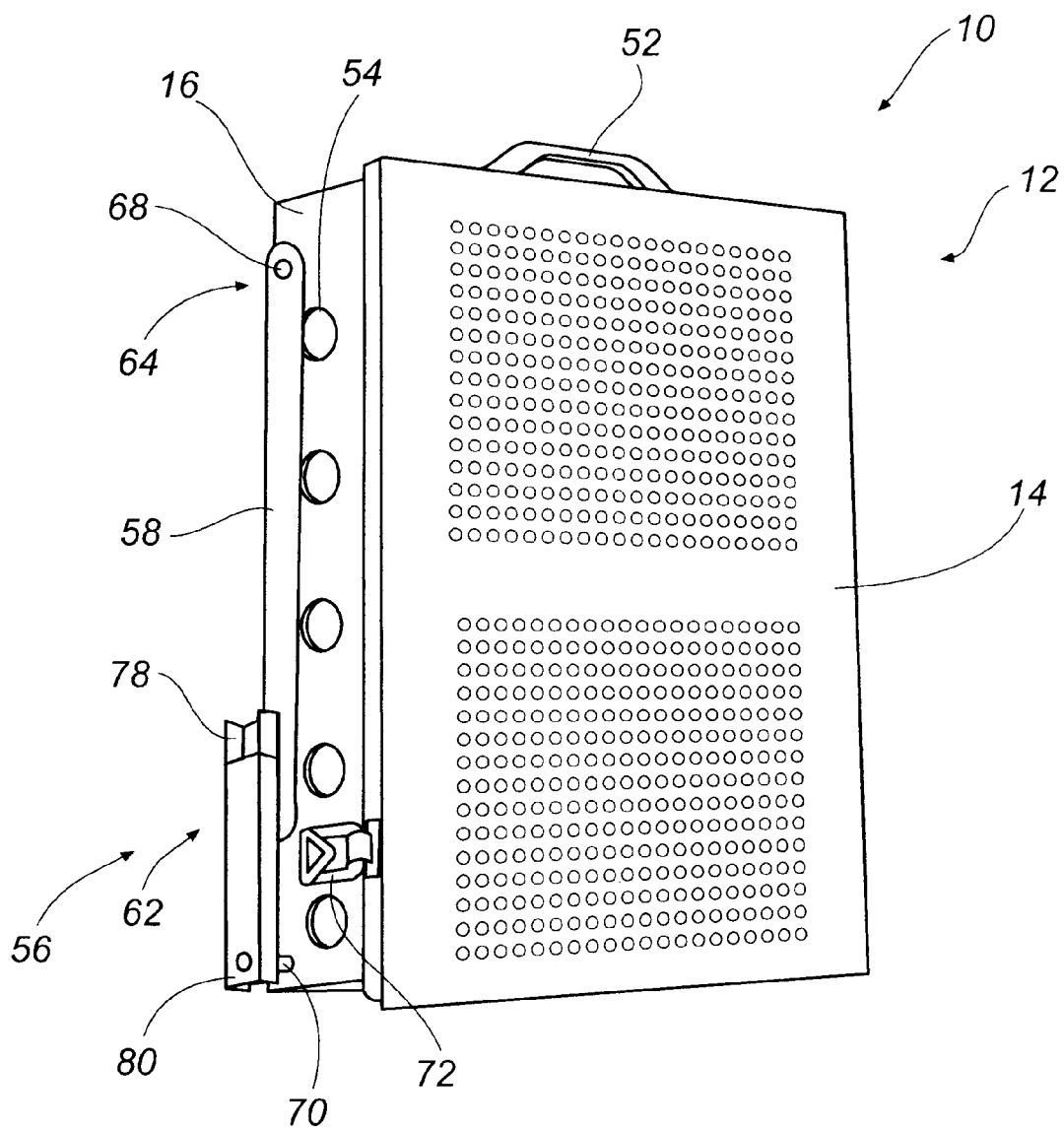
FIG. 5 is a perspective view of the signal device shown in FIGS. 1–4, depicting the device in a folded configuration.

In use, the signaling device described herein can be stored in a folded arrangement shown in FIG. 5. In this folded arrangement, the support legs 58, as well as the support arms 62, are retracted so as to be aligned substantially parallel with the container body 16. Due to its slim profile, several such signaling devices 10 can be stored in a military vehicle used by ground personnel. Although each signaling device 10 can include the heat sources 84 when in the folded arrangement, normally these heat sources are stored separately with each source being individually wrapped in an impermeable plastic wrapper (not shown). When needed for use in constructing a landing site such as a forward arming and refuel point (FARP), the signaling devices 10 can be carried to the selected point by the carrying handles 52. Each device 10 then can be set in position by extending the support mechanism 56 so that the support legs 58 are fully extended away from the container body 16 and the support arms 62 similarly are in their fully extended and locked positions (FIG. 1). At this point, each device 10 can be fixed in position by driving the support legs 58 into the ground. This can be accomplished by simply stepping down on the cross-member 60 which connects to both of the support legs 58. Normally, the devices are arranged in a conventional inverted "Y" configuration as shown in FIG. 6. When such configuration is used, pilots align the helicopter such that the aircraft will be positioned between the two tips of the "Y" when the aircraft touches down.

Once arranged in the desired pattern, each signaling device 10 can be opened by releasing the fastening mechanism and swinging each lid 14 to the open position depicted in FIGS. 2 and 3. The heat sources 84 then can be removed from their plastic wrappers and placed in the first and second compartments 46 and 48 of each container body 16. Once the heat sources 84 are disposed within their respective compartments, the lid 14 can again be closed and locked with the lid fasteners 72, as indicated in FIG. 1. When inside the containers 12, the heat sources 84 are exposed to air (and therefore oxygen) that enters each container through the openings 54 provided in the lateral sides 40 and 42. After approximately 20 minutes, each of the heat sources 84 reaches a temperature of approximately 190° F. Due to the insulation 86 disposed in the container bodies 16, the radiant heat produced by each of the heat sources 84 escapes each container 12 only through the lid 14. In particular, the heat sources 84 heats the lids 14, creating a thermal signature emitted by the exterior surface 24 of the lid at a temperature of at least 40° above ambient temperature. Due to the gaskets 31 provided on each lid 14, the heat transferred to the lid is not similarly transferred to the container body 16. As the chemical reaction continues to take place in the heat sources 84, water vapor is produced. The majority of this water vapor escapes through the lid perforations 28, while the excess can drain out of the container 12 through a gap created between the lid 14 and the container body 16 of each device 10.

Once optimal conditions have been reached, the signaling devices 10 can easily be sighted by aircraft heat sensing systems such as FLIR. Due to the insulation 84 and the gaskets 31, only the exterior surface 24 of the lid 14 is heated, therefore creating a thermal signature that is directional in nature and, therefore, difficult to detect from peripheral positions. However, if it is determined that enemy troops are in the area and it is not safe for an aircraft to land, these thermal signatures can be quickly hidden by simply turning each of the signaling devices over onto the exterior surface 24 of the lid 14. Once in the turned over position, the container lid 14 will continue to be heated although it will be substantially undetectable by heat sensing systems. Once the threat has passed, each device 10 can again be positioned in a signaling configuration such as that shown in FIG. 6. After the aircraft has landed and again takes to the air, the signaling devices 10 can be reopened, the containers 12 stored away, and the heat sources 84 discarded. Because each of the heat sources 84 typically only contains wood, iron filings, salt, activated charcoal, and vermiculite, the user need not be concerned about environmental damage when disposing the heat sources.

So described, the thermal signaling system disclosed herein provides several advantages not presently realized in the art. First and foremost, the system provides for an effective means of signaling aircraft with a thermal signature. As described above, this thermal signature can be sited from large distances which can be critical in tactical situations in which the pilots are unfamiliar with the surrounding territory. In addition, the system provides a safe means of providing this thermal signature, free of electrical elements and volatile fluids which could cause harm to personnel. Finally, the system provides for directional thermal signaling which is not easily detectable by hostile forces.

While preferred embodiments of the invention have been disclosed in detail in the foregoing description and drawings, it will be understood by those skilled in the art that variations and modifications thereof can be made without departing from the spirit and scope of the invention as set forth in the following claims. For instance, although a preferred arrangement has been described for the heat sources 84, it is to be understood that any heat source capable of raising the temperature of the container lid to at least 40° above the ambient temperature for a significant amount of time could be used. Moreover, although the container body has been illustrated and described as comprising two separate compartments, it will be appreciated by persons having ordinary skill in the art that one or greater than two such compartments could be used as desired.

What is claimed is:

1. A thermal signaling device, comprising:

a container made of a thermally conductive material including a thermal emitting surface and an interior space; and at least one heat source disposed within said interior space of said container, wherein said heat source is activatable to heat said thermal emitting surface such that said thermal emitting surface can be detected by a thermal sensing system.

2. The device of claim 1, wherein said container includes a container body which forms said interior space and a container lid which forms said thermal emitting surface.

3. The device of claim 2, wherein said container lid includes a plurality of perforations that extend therethrough.

4. The device of claim 2, wherein said container lid includes at least one gasket that thermally insulates said container lid from said container body when said lid is in the closed position.

5. The device of claim 2, wherein said container lid is pivotally attached to said container body such that said container can be opened and closed with said container lid.

6. The device of claim 5, further comprising a fastening mechanism mounted to said container body and to said container lid, said fastening mechanism being usable to secure said container lid in the closed position.

7. The device of claim 1, further comprising a retractable support mechanism with which said container can be supported in a reclined orientation, said support mechanism being positionable in an extended position and a retracted position.

8. The device of claim 7, wherein said retractable support mechanism includes at least one support leg that is pivotally attached to said container at a first pivot point.

9. The device of claim 8, wherein said retractable support mechanism further includes a support arm pivotally attached to said container at a second pivot point and further attached to said at least one support leg at a third pivot point.

10. The device of claim 9, wherein said support arm further includes a locking mechanism that locks said arm in an extended position.

11. The device of claim 1, wherein said heat source comprises an air activated heat source.

12. The device of claim 11, wherein said air activated heat source includes a plurality of iron filings that oxidize in an exothermic reaction when exposed to oxygen.

13. The device of claim 11, wherein said container includes a plurality of openings which provide for the ingress of air into said interior space.

14. The device of claim 1, further comprising insulation disposed within said interior space, said insulation insulating said container such that heat can escape from said container only through said thermal emitting surface.

15. The device of claim 1, wherein said container is constructed of a metal material.

16. The device of claim 1, wherein said container is constructed of a sheet metal material.

17. A thermal signaling device, comprising:

a container including a container body which forms an interior space and a container lid attached to said container body that forms a thermal emitting surface;

at least one heat source disposed within said interior space of said container, wherein said heat source is activatable to heat said thermal emitting surface such that said thermal emitting surface can be detected by a thermal sensing system; and a retractable support mechanism with which said container can be supported in a reclined orientation, said support mechanism being positionable in an extended position and a retracted position.

18. The device of claim 17, wherein said container lid includes a plurality of perforations that extend therethrough.

19. The device of claim 17, wherein said container lid includes at least one gasket that thermally insulates said container lid from said container body when said lid is in the closed position.

20. The device of claim 17, wherein said container lid is pivotally attached to said container body such that said container can be opened and closed with said container lid.

21. The device of claim 17, further comprising a fastening mechanism mounted to said container body and to said container lid, said fastening mechanism being usable to secure said container lid in the closed position.

22. The device of claim 17, wherein said retractable support mechanism includes at least one support leg that is pivotally attached to said container at a first pivot point.

23. The device of claim 22, wherein said retractable support mechanism further includes a support arm pivotally attached to said container at a second pivot point and further attached to said at least one support leg at a third pivot point.

24. The device of claim 23, wherein said support arm further includes a locking mechanism that locks said arm in a fully extended position.

25. The device of claim 17, wherein said heat source comprises an air activated heat source.

26. The device of claim 25, wherein said air activated heat source includes a plurality of iron filings that oxidize in an exothermic reaction when exposed to oxygen.

27. The device of claim 26, wherein said container includes a plurality of openings which provide for the ingress of air into said interior space.

28. The device of claim 17, further comprising insulation disposed within said interior space, said insulation insulating said container such that heat can escape from said container only through said thermal emitting surface.

29. The device of claim 17, wherein said container is constructed of a metal material.

30. The device of claim 17, wherein said container is constructed of a sheet metal material.

31. A method for signaling to an aircraft, comprising:

activating at least one non-electrical, non-volatile heat source;

positioning at least one signaling container on the ground in a desired pattern, each signaling container including a thermal emitting surface; and placing at least one heat source in each of the containers such that the heat source will heat the thermal emitting surface so that aircraft can detect the thermal emitting surface with a heat sensing system.

32. The method of claim 31, wherein the heat source comprises an air activated heat source.

33. The method of claim 32, wherein the container comprises a container body and a container lid that is pivotally attached thereto and which can be locked in the closed position with a fastening mechanism.

34. The method of claim 31, wherein a plurality of heat sources and containers are used, and the containers are arranged in an inverted "Y" pattern on the ground.

* * * * *